3,511,844
ARALKYL PIPERIDINEMETHANOLS AND
INTERMEDIATES THEREFOR
Janis Plostnieks, Philadelphia, Pa., assignor to McNeil Laboratories, Incorporated, a corporation of Pennsylvania
No Drawing. Filed Mar. 29, 1968, Ser. No. 717,366
Int. Cl. C07d 29/22, 29/28
U.S. Cl. 260—294.3
8 Claims

ABSTRACT OF THE DISCLOSURE

The compounds are of the class of 2-aralkyl-2-piperidinemethanols which are useful as anti-arrhythmic agents; and to certain novel intermediates used in the preparation thereof.

This invention relates to novel aralkyl derivatives of 2-piperidinemethanol and, more particularly, to 2-benzyl-2-piperidinemethanols the benzyl moiety of which bears a substituent (R) in either the para- or meta-position. Said piperidinemethanols have the following formula:

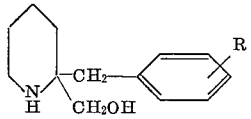

(I)

wherein the R substituent is in the para- or meta-position of the benzyl moiety and is a member selected from the group consisting of amino, dimethylamino, hydroxy, benzyloxy and aminoethyl. The therapeutically active non-toxic acid addition salts of the foregoing compounds are also embraced within the scope of this invention, as are certain novel intermediates used in the syntheses thereof.

As used herein, "lower alkyl" may be straight or branch chained saturated hydrocarbons having from 1 to about 6 carbon atoms, such as, for example, methyl, ethyl, propyl, isopropyl, butyl, pentyl, hexyl and the like alkyls.

The compounds of Formula I are obtained by several processes starting with the intermediates, ethyl 2-(p-nitrobenzyl)-6-oxopipecolate, also denoted as ethyl 2-(p-nitrobenzyl)-6-oxo-2-piperidinecarboxylate, which is used to prepare those compounds of Formula I wherein the R substituent is in the para-position of the benzyl moiety, and ethyl 2-(m-nitrobenzyl) - 6 - oxopipecolate, also denoted as ethyl 2-(m-nitrobenzyl)-6-oxo-2-piperidinecarboxylate, which is used to prepare those compounds of Formula I wherein the R substituent is in the meta-position of the benzyl moiety. These intermediates, which are novel compounds and, as such, constitute a feature of this invention, may be structurally represented by the following formula:

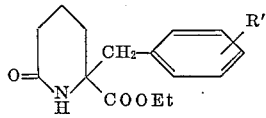

(II)

wherein R' is nitro and in the p- or m-position.

The intermediate compounds of Formula II are prepared by alkylating the known compound, ethyl 2-oxocyclopentanecarboxylate, in the form of an alkali metal salt, with p-nitrobenzyl chloride or m-nitrobenzyl chloride as the alkylating agent in a suitable organic solvent, e.g., dimethylformamide, and then transforming the respective 1-p-nitrobenzyl or 1-m-nitrobenzyl derivative of ethyl 2-oxocyclopentanecarboxylate thus obtained into an imino-expanded ring carboxylate, namely, the desired 2-(p-nitrobenzyl) or 2-(m-nitrobenzyl) derivative, respectively, of ethyl 6-oxopipecolate (II), under the conditions of a Schmidt reaction, i.e., by contacting said oxocyclopentanecarboxylate ester with hydrazoic acid in a suitable organic solvent, e.g., chloroform, benzene and the like, in the presence of a strong mineral acid such as sulfuric acid. The foregoing synthesis of Formula II type compounds may be illustrated by the following reaction diagram:

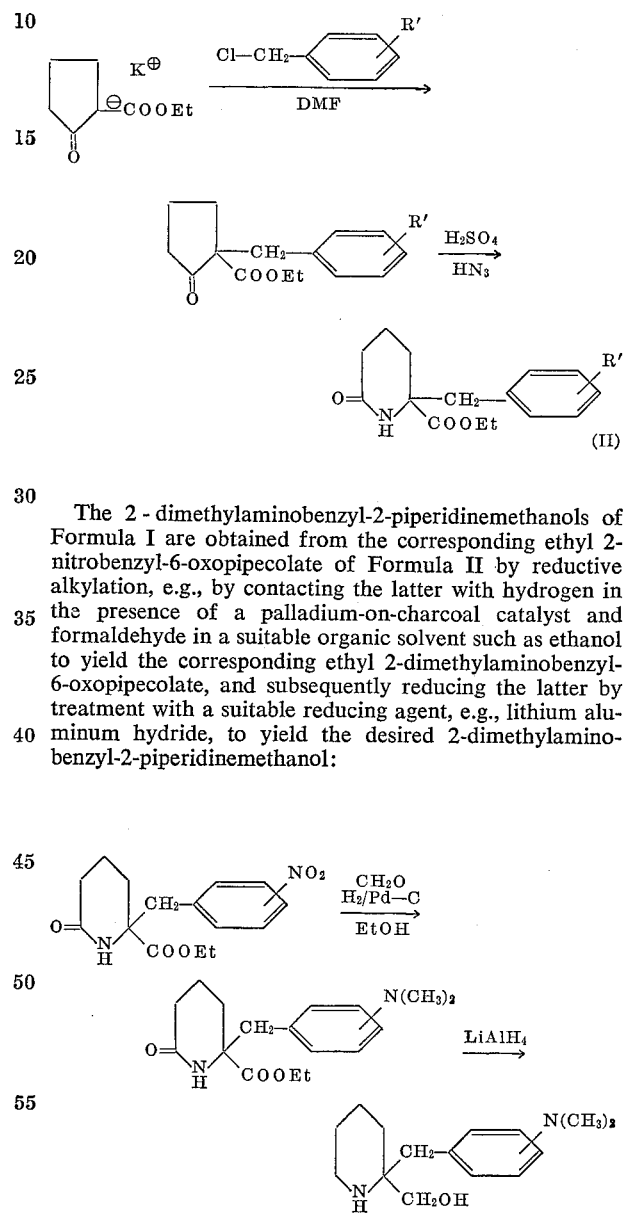

The 2 - dimethylaminobenzyl-2-piperidinemethanols of Formula I are obtained from the corresponding ethyl 2-nitrobenzyl-6-oxopipecolate of Formula II by reductive alkylation, e.g., by contacting the latter with hydrogen in the presence of a palladium-on-charcoal catalyst and formaldehyde in a suitable organic solvent such as ethanol to yield the corresponding ethyl 2-dimethylaminobenzyl-6-oxopipecolate, and subsequently reducing the latter by treatment with a suitable reducing agent, e.g., lithium aluminum hydride, to yield the desired 2-dimethylaminobenzyl-2-piperidinemethanol:

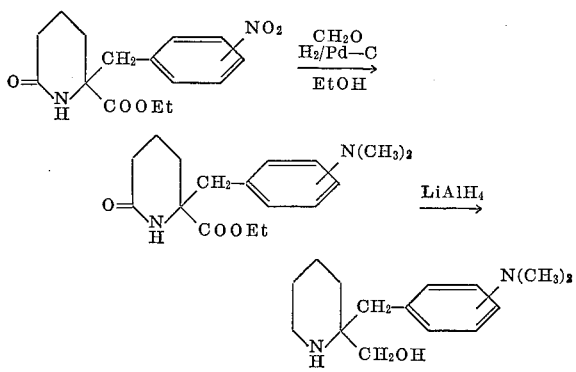

To prepare the compounds of Formula I, wherein R is amino, the nitro function of the Formula II nitrobenzyloxopipecolate is reduced to an amino function by catalytic hydrogenolysis, for example, by contact with hydrogen and a palladium-on-charcoal catalyst in ethanol, and then the thus-obtained ethyl 2-aminobenzyl-6-oxopipecolate is subjected to further reduction, for example, by contact with lithium aluminum hydride, to yield the desired 2-aminobenzyl-2-piperidinemethanol:

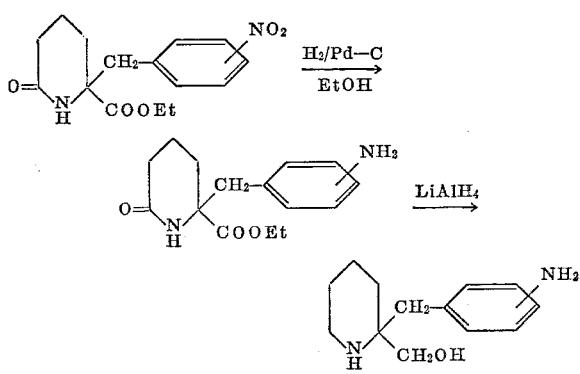

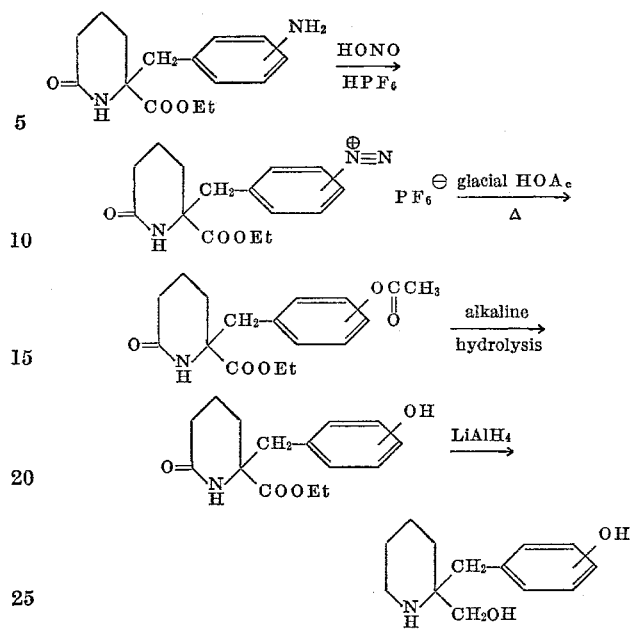

The aforementioned ethyl 2-(p- or m-)aminobenzyl-6-oxopipecolates, which are novel intermediates and, as such, constitute an additional feature of this invention, may be used as starting materials for preparing those compounds of Formula I wherein R is aminomethyl, hydroxy or benzyloxy. For example, diazotization of said ethyl 2-aminobenzyl-6-oxopipecolate by treatment with nitrous acid, followed by treatment of the thus-obtained diazonium salt with cuprous cyanide affords the corresponding ethyl 2-(p- or m-)cyanobenzyl-6-oxopipecolate, which is then reduced by means of a suitable reducing agent, e.g., lithium aluminum hydride, to yield the desired 2-(p- or m-)aminomethyl-2-piperidinemethanol of Formula I:

Alkylation of the aforementioned 2-hydroxybenzyl oxopipecolate with benzyl chloride affords the corresponding ethyl 2-(p- or m-)benzyloxybenzyl-6-oxopipecolate which is then reduced with lithium aluminum hydride to the desired 2-benzyloxybenzyl-2-piperidinemethanol of Formula I:

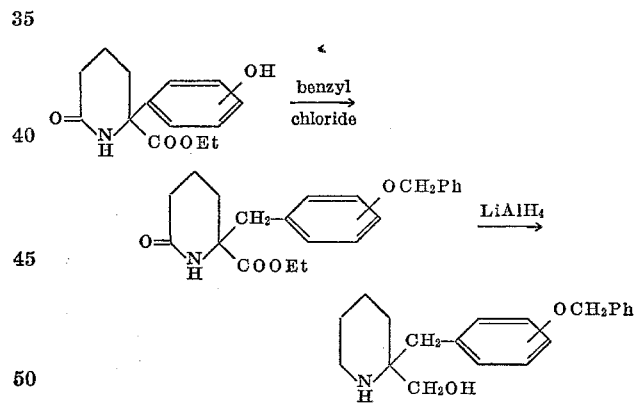

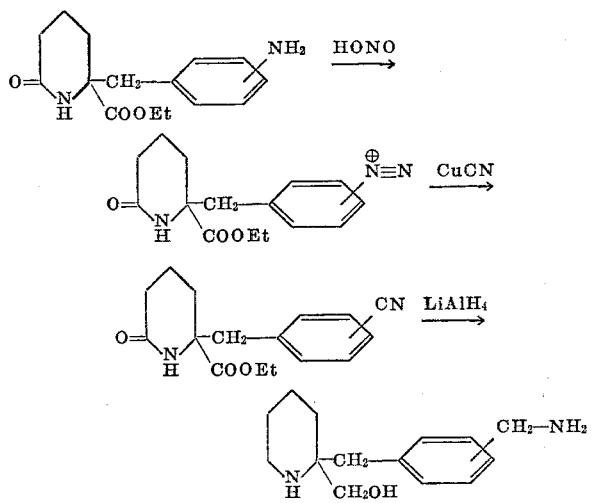

Diazotization of the 2-aminobenzyl oxopipecolate as previously described, followed by treatment with hexafluorophosphoric acid, affords a precipitate of the corresponding diazonium hexafluorophosphate. This salt is treated with glacial acetic acid, preferably under reflux, to yield the corresponding ethyl 2-(p- or m-)acetoxybenzyl-6-oxopipecolate which is hydrolyzed in an alkaline workup, whereby the acetoxy function is converted to a hydroxy function, and the thus-obtained ethyl 2-(p- or m-)hydroxybenzyl-6-oxopipecolate is contacted with a suitable reducing agent, e.g., lithium aluminum hydride, to yield the corresponding 2-hydroxy-benzyl-2-piperidinemethanols of Formula I:

An alternative method of preparing the 2-hydroxybenzyl-2-piperidinemethanols of Formula I is by catalytic hydrogenolysis of the corresponding 2-benzyloxybenzyl-2-piperidinemethanol.

Therapeutically active acid addition salts of (I) are obtained by contact with an appropriate acid, as for example, an inorganic acid such as hydrochloric, sulfonic, phosphoric and the like acids, or an organic acid such as acetic, lactic, maleic, malonic, fumaric, benzoic, benzenesulfonic and the like acids.

Due to the asymmetric center present in the subject compounds (I), it is evident that their existence in the form of resolved enantiomorphs is possible. It is naturally intended that such enantiomorphs are included within the scope of this invention.

The compounds of Formula I, in base or salt form, have been found to possess valuable pharmacological properties. Such compounds are useful as anti-arrhythmic agents as demonstrated (see Example XX) by their ability to markedly decrease fibrillation in laboratory animals in dosages generally as low as 1–20 mg./kg. body weight. These novel compounds can be administered in therapeutic dosages in conventional pharmaceutical formulations for oral and parenteral administration, for example, tablets, capsules, liquids, injectables and the like.

In addition to those previously mentioned, the following novel intermediates are also included within the scope of this invention, the 2-(p- or m-)-hydroxybenzyl, 2-(p- or m-)cyanobenzyl, 2-(p- or m-)-dimethylaminobenzyl and 2-(p- or m-)-benzyloxybenzyl derivatives of ethyl 6-oxopipecolate. All such intermediates may be illustrated by the following formula:

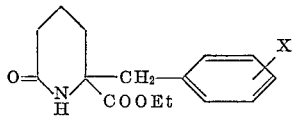

wherein the X substituent is a member selected from the group consisting of nitro, amino, hydroxy, cyano, dimethylamino and benzyloxy, said X substituent being in the p-or m-position of the benzyl moiety.

The following examples are intended to illustrate, but not to limit the scope of the present invention.

EXAMPLE I

Ethyl 1-(p-nitrobenzyl) - 2 - oxocyclopentanecarboxylate.—To a solution containing 106 g. (0.60 mole) of the potassium salt of ethyl-2-oxocyclopentanecarboxylate in 300 ml. of dimethylformamide is added 104 g. (0.60 mole) of p-nitrobenzyl chloride. The reaction mixture is heated and stirred at 80° C. for 2 hours and then stirred at room temperature for 3 hours. The solvent is evaporated in vacuo and the residue is suspended in methylene chloride and washed with water several times. The organic layer is dried over anhydrous magnesium sulfate and evaporated in vacuo yielding about 85 g. (50%) of ethyl 1 - (p-nitrobenzyl)-2-oxocyclopentanecarboxylate as a tan solid, M.P. 78–84° C. Recrystallization from ether raises the M.P. to 93–95° C.

*Analysis.*—Calcd. for $C_{15}H_{17}NO_5$ (percent): C, 61.85; H, 5.88; N, 4.81. Found (percent): C, 61.91; H, 5.89; N, 5.06.

EXAMPLE II

Ethyl 1-(m-nitrobenzyl) - 2 - oxocyclopentane carboxylate is obtained by repeating the procedure of Example I except that an equivalent quantity of m-nitrobenzyl chloride is used as the alkylating agent in place of the p-nitrobenzyl chloride used therein.

EXAMPLE III

Ethyl 2 - (p-nitrobenzyl)-6-oxopipecolate.—To 500 ml. of a cooled (−10° C.) chloroform solution of hydrazoic acid, prepared from 61 g. (0.94 mole) of sodium azide, 67 ml. of water and 47 g. (0.47 mole) of conc. sulfuric acid (q.s. $CHCl_3$) is added 87 g. (0.31 mole) of ethyl 1-(p-nitrobenzyl)-2-oxocyclopentanecarboxylate. The mixture is stirred vigorously over a period of 1.25 hours, keeping the temperature of the reaction below −5° C. The evolution of nitrogen is followed by bubbling it through a beaker of water. After addition is complete, the reaction mixture is stirred in an ice-bath for an additional 0.5 hour. The reaction mixture is then poured carefully onto 700 g. of ice and the layers are separated. The organic layer is washer with water, dilute sodium hydroxide solution and water. The solution is dried over anhydrous magnesium sulfate and the solvent is removed. The residue is crystallized from ether. Yield: about 76.5 g. (83%) of ethyl 2-(p-nitrobenzyl) - 6 - oxopipecolate, M.P. 124–127° C. Recrystallization twice from ethyl acetate-heptane affords the pure product as a white solid, M.P. 128–130° C.

*Analysis.*—Calcd. for $C_{15}H_{18}N_2O_5$ (percent): C, 58.81; H, 5.92; N, 9.15. Found (percent): C, 58.88; H, 5.81; N, 8.97.

EXAMPLE IV

Ethyl 2-(m-nitrobenzyl)-6-oxopipecolate is prepared by following the procedure of Example III starting with 128 g. (0.45 mole) of ethyl 1-(m-nitrobenzyl) - 2 - oxocyclopentane carboxylate and 700 ml. hydrazoic acid solution in chloroform, prepared from 90 g. (1.36 mole) of sodium azide, 90 ml. of water and 68 ml. of conc. sulfuric acid (q.s. $CHCl_3$). The yield of product ester is about 87 g. (65%) as a pale yellow solid, M.P. 158–168° C.

EXAMPLE V

Ethyl 2-[p-(N,N-dimethylamino)benzyl] - 6 - oxopipecolate.—A solution of 10 g. (0.0326 mole) of ethyl 2 - (p-nitrobenzyl)-6-oxopipecolate in 120 ml. of 80% aqueous ethanol and 40 ml. of 37% formaldehyde is shaken under an initial hydrogen pressure of 50 p.s.i.g. with 1 g. of 30% palladium-on-carbon catalyst. The reduction is rapid and the mixture warms spontaneously to about 50° C. Shaking under hydrogen is continued for five hours. The catalyst is filtered off and the filtrate is concentrated in vacuo to remove most of the volatile components. The residue is taken up in 100 ml. of 5% hydrochloric acid and washed with two 50 ml. portions of ether. The aqueous solution is made basic (pH 9) with cold 50% sodium hydroxide. The basic product is extracted into two 100 ml. portions of ether which are combined, dried over anhydrous magnesium sulfate, and concentrated in vacuo to yield about 10.5 g. of crude white solid, ethyl 2-[p-(N, N-dimethylamino)benzyl] - 6 - oxopipecolate. Trituration with ether affords the pure product, M.P. 112–113.5° C.

EXAMPLE VI

2 - [p - (N,N - dimethylamino)benzyl] - 2 - piperidinemethanol.—Ethyl 2-[p-(N,N-dimethylamino)benzyl] - 6- oxopipecolate (7.3 g., 0.024 mole) in 60 ml. of freshly distilled tetrahydrofuran is slowly added to a suspension of 7.5 g. (0.2 mole) of lithium aluminum hydride in 240 ml. of tetrahydrofuran. The reaction is heated and stirred under reflux overnight. Water is added dropwise to decompose the excess reducing agent. Inorganic salts are removed by filtration. The water layer is extracted several times with ether. The ether solution is dried over anhydrous magnesium sulfate and evaporated in vacuo. The residual oily product is crystallized from ether-petroleum ether as white crystals, M.P. 100–105° C. Recrystallization from ether yields the pure 2-[p-(N,N-dimethylamino)benzyl]-2-piperidinemethanol, white crystals, M.P. 116–118° C.

*Analysis.*—Calcd. for $C_{15}H_{24}N_2O$ (percent): C, 72.54; H, 9.74; N, 11.28. Found (percent): C, 72.87; H, 9.70; N, 11.44.

EXAMPLE VII

The analogous m-(N,N-dimethylamino)benzyl derivatives of the oxopipecolate and piperidinemethanol of Examples V and VI, respectively, are obtained by repeating the procedures therein except that an equivalent quantity of ethyl-2-(m-nitrobenzyl)-6-oxopipecolate is used as the starting material in Example V instead of the corresponding p-nitrobenzyl compound.

EXAMPLE VIII

Ethyl 2-(p-aminobenzyl)-6-oxopipecolate.—A solution of 25 g. (0.084 mole) of ethyl 2-(p-nitrobenzyl)-6-oxopipecolate in 1 liter of absolute ethanol is hydrogenated under a hydrogen pressure of 50 p.s.i. over a period of three hours using 1 g. of 30% palladium-on-charcoal catalyst. The mixture warms spontaneously to about 40° C. The catalyst is filtered off and the filtrate concentrated in vacuo to a residual light amber oil. The crude oily product is dissolved in 200 ml. of 10% hydrochloric acid and washed with 2×50 ml. of chloroform. The aqueous layer is basified to pH 9 with 50% sodium hydroxide solution and extracted with 2×200 ml. of chloroform. The extract is dried over anhydrous magnesium sulfate and filtered. The filtrate is concentrated in vacuo to an oil which slowly crystallizes. The resulting ethyl 2-(p-aminobenzyl)-6-oxopipecolate has a melting point of 128–134° C. Recrystallization from ethyl acetate raises the M.P. to 139–141° C.

*Analysis*.—Calc'd for $C_{15}H_{20}N_2O_3$ (percent): C, 65.19; H, 7.30; N, 10.14. Found (percent): C, 65.30; H, 7.60; N, 10.32.

EXAMPLE IX 2-(p-aminobenzyl)-2-piperidinemethanol.—To a stirred suspension of lithium aluminum hydride (19.5 g., 0.52 mole) in 300 ml. of freshly distilled tetrahydrofuran is added dropwise a solution of 23 g. (0.086 mole) of ethyl 2-(p-aminobenzyl)-6-oxopipecolate in 75 ml. of tetrahydrofuran over a twenty minute period. The mixture refluxes spontaneously and is heated to gently reflux overnight. After cooling, water (90 ml.) is added dropwise with stirring so that the temperature does not exceed 20° C. The inorganics are filtered off and washed several times with ether. The combined filtrates are dried over anhydrous magnesium sulfate and concentrated in vacuo to give 19 g. of 2-(p-aminobenzyl)-2-piperidinemethanol as a tan solid. The hydrochloride salt is prepared in 2-propanol with ethereal hydrogen chloride. Two recrystallizations from methanol-ethanol yield pure 2-(p-aminobenzyl) - 2 - piperidine-methanol dihydrochloride, M.P. 303–305° C.

*Analysis*.—Calc'd for $C_{13}H_{20}N_2O \cdot 2HCl$ (percent): C, 53.25; H, 7.56; N, 9.55. Found (percent): C, 52.97; H, 7.40; N. 9.71.

EXAMPLE X

By repeating the reduction procedures of Examples VIII and IX, except that an equivalent quantity of ethyl 2-(m-nitrobenzyl)-6-oxopipecolate is initially employed, there are obtained as respective products, ethyl 2-(m-aminobenzyl)-6-oxopipecolate, M.P. 122–132° C., and 2-(m-aminobenzyl)-2-piperidinemethanol, M.P. after recrystallizations from acetone-petroleum ether and methylene chloride is 121.5–123° C.

EXAMPLE XI

Ethyl 2 - (p - hydroxybenzyl)-6-oxopipecolate.—To a solution of 27 g. (0.098 mole) of ethyl 2-(p-aminobenzyl)-6-oxopipecolate in 200 ml. of water and 25 ml. of concentrated hydrochloric acid (cooled to 0° to −10° C.) is added dropwise with stirring a solution of 7.6 g. (0.11 mole) of sodium nitrite in 60 ml. of water. To the clear, dark amber solution is added 60 ml. of 65% aqueous hexafluorophosphoric acid in one portion. The resulting tan colored suspension is filtered and washed with cold water and then ether. The resultant diazonium hexafluorophosphate salt, yield about 46 g. is used without further purification in the next step.

A suspension of 20 g. of the diazotized product in 100 ml. of glacial acetic acid is heated to reflux for 10 minutes. During this period nitrogen is evolved and the mixture becomes homogeneous. The acetic acid is removed in vacuo and the residue is triturated with a mixture of water and ether. Solid potassium carbonate is added to the system slowly to pH 8–9. The ether phase is separated and dried over anhydrous magnesium sulfate and filtered. White crystals separate on standing. Recrystallization once from methylene chloride and ether and once from chloroform and ethyl acetate yields about 4.7 g. of ethyl 2-(p-hydroxybenzyl)-6-oxopipecolate as white crystals, M.P. 148.5–150° C.

*Analysis*.—Cal'd for $C_{15}H_{19}NO_4$ (percent): C, 64.96; H, 6.91; N, 5.05. Found (percent): C, 64.68; H, 6.83; N, 5.09.

EXAMPLE XII

Ethyl 2 - (p-benzyloxybenzyl)-6-oxopipecolate.—To a suspension of 4 g. (0.0125 mole) of ethyl 2-(p-hydroxybenzyl)-6-oxopipecolate in 55 ml. of absolute ethanol is added dropwise a solution of 0.285 g. (0.0125 mole) of sodium metal in 84 ml. of absolute ethanol. A volume of 69.5 ml. (one-half of total) is removed and treated with 1.12 g. (0.00655 mole) of benzyl bromide. The mixture is allowed to stand overnight, and then concentrated in vacuo at room temperature to give a white semisolid residue which is dissolved in 150 ml. of methylene chloride and washed with 15 ml. of water. The methylene chloride phase is dried over anhydrous magnesium sulfate and filtered. The filtrate is concentrated in vacuo to yield the product as a crude oily residue. The product, ethyl 2-(p-benzyloxybenzyl)-6-oxopipecolate crystallizes from methylene chloride and ether, M.P. 144–145° C. One recrystallization from the same solvent system yields the pure product, M.P. 146.5–147° C.

*Analysis*.—Calc'd for $C_{22}H_{25}NO_4$ (percent): C, 71.91; H, 6.86; N, 3.81. Found (percent): C, 71.52; H, 6.60; N, 3.81.

EXAMPLE XIII 2-(p - benzyloxybenzyl) - 2 - piperidinemethanol.— To a stirred suspension of 6 g. (0.16 mole) of lithium aluminum hydride in 100 ml. of dry 1,2-dimethoxyethane is added dropwise a suspension of 11 g. (0.03 mole) of ethyl 2-(p-benzyloxybenzyl) - 6 - oxopipecolate in 60 ml. of dry 1,2-dimethoxyethane. The mixture warms spontaneously and evolution of a gas is noted. After refluxing overnight, the mixture is cooled to 10° C. and 25 ml. of water is added dropwise so that the temperature does not exceed 20° C. Stirring is continued for 1 hour. The inorganics are filtered off and washed several times with fresh 1,2-dimethoxyethane and then ether. The combined organic filtrate is dried over anhydrous magnesium sulfate and concentrated in vacuo to give 4 g. of a residual oil. The filtered inorganics are suspended in 200 ml. of chloroform and 20 ml. of water, refluxed for 15 minutes and filtered. The filtrate is dried over anhydrous magnesium sulfate, filtered, and added to the above oil. Concentration in vacuo yields about 8 g. of 2-(p-benzyloxybenzyl) - 2 - piperidinemethanol as a pale yellow solid, M.P. 125–145° C. After one recrystallization from methylene chloride and ether and one recrystallization from 2-propanol and methanol, about 4.5 g. of the pure product is isolated as white crystals, M.P. 150–152° C.

*Analysis*.—Calcd. for $C_{20}H_{25}NO_2$ (percent): C, 77.13; H, 8.09; N, 4.50%. Found (percent): C, 76.59; H, 8.01; N, 4.48%.

EXAMPLE XIV

In accordance with the procedures outlined in Examples XI through XIII, the product 2-(m-benzyloxybenzyl)-2-piperidinemethanol is prepared by starting with an equivalent quantity of ethyl 2-(m-aminobenzyl)-6-oxopipecolate in place of the corresponding p-aminobenzyl compound used in Example XI.

EXAMPLE XV

2 - (p-hydroxybenzyl)-2-piperidinemethanol.—A solution of 4.5 g. (0.0145 mole) of 2-p-benzyloxybenzyl)-2-piperidinemethanol in 150 ml. of absolute ethanol is shaken under an initial hydrogen pressure of 50 p.s.i.g. with 30% palladium-on-charcoal catalyst for 2 hours at room temperature. The catalyst is filtered off and the filtrate is concentrated in vacuo to yield about 3.8 g. of the crude product as a gummy residue. The crude gum is dissolved in 300 ml. of methylene chloride and filtered. The filtrate is concentrated in vacuo to give about 3.5 g. of 2-(p-hydroxybenzyl)-2-piperidinemethanol as a white solid, M.P. about 80° C.

The fumarate salt is prepared from 3.5 g. (0.016 mole) of the above base in 50 ml. of 2-propanol and 1.84 g. (0.016 mole) of fumaric acid in 30 ml. of 2-propanol. After stirring and refluxing for 5 minutes, the suspension is allowed to cool to room temperature and filtered. The white salt, 2-(p-hydroxybenzyl) - 2 - piperidinemethanol fumarate, after recrystallization from water and 2-propanol, weighs about 2.9 g. and melts at 245° C. (dec.)

*Analysis*.—Calcd. for $(C_{13}H_{19}NO_2)_2 \cdot C_4H_4O_4$ (percent): C, 64.49; H, 7.58; N, 5.01%. Found (percent): C, 64.56; H, 7.55; N, 5.16%.

EXAMPLE XVI

The reduction procedure of Example XV is repeated on an equivalent quantity of 2 - (m-benzyloxybenzyl)-2-piperidinemethanol instead of the corresponding para-derivative used therein to yield as products, 2-(m-hydroxybenzyl)-2-piperidinemethanol and the fumarate salt thereof.

EXAMPLE XVII

Ethyl 2-(p-cyanobenzyl)-6-oxopipecolate.—To a solution of 90 g. of cupric sulfate pentahydrate in 288 ml. of water is added concentrated sulfuric acid to pH 3. The dark blue solution is warmed to 50–60° C. To this is added a solution of 25.3 g. of sodium bisulfite in 72 ml. of water, the addition being over a 1 to 2 minute period while maintaining a temperature of 50–60° C. To the resulting dark green solution is added immediately a solution of 25.3 g. of potassium cyanide in 72 ml. of water. The white precipitate of cuprous cyanide is filtered and washed with water. The solid is added to a solution of 46.8 g. of potassium cyanide in 112.5 ml. of water to form a clear solution. The cyanide solution is set aside while the diazonium salt solution is prepared.

A solution of 27 g. (0.1 mole) of ethyl 2-(p-aminobenzyl)-6-oxopipecolate in 75 ml. of water and 19.6 g. (0.2 mole) of concentrated sulfuric acid is cooled to 5° C. To this is added dropwise a solution of 6.9 g. (0.1 mole) of sodium nitrite in 75 ml. of water while keeping the temperature below 5° C.

The diazonium salt solution is added dropwise to the cyanide solution while stirring at 0° C. As the crude product is formed, the mixture foams and turns red-orange in color. The mixture is stirred at 0 to 30° C. for one hour. The crude product is filtered off and the filtrate is extracted with two 200 ml. portions of methylene chloride. The extract is combined with the crude solid and the inorganics are filtered off. The methylene chloride solution is dried over anhydrous magnesium sulfate. The dried solution is filtered through 100 g. of silica with the aid of additional methylene chloride. The filtrate is concentrated to about 200 ml. and washed with 100 ml. of 10% hydrochloric acid. The methylene chloride phase is treated with charcoal, dried over anhydrous magnesium sulfate, and filtered through 200 g. of silica. The yield of pale orange solid, ethyl 2-(p-cyanobenzyl)-6-oxopipecolate, after evaporation of the solvent is about 19 g., M.P. 140–142° C. A sample recrystallized three times from 2-propanol melted at 153–155° C.

*Analysis.*—Calcd. for $C_{16}H_{18}N_2O_3$ (percent): C, 67.11; H, 6.34; N, 9.78%. Found (percent): C, 66.77; H, 6.03; N, 10.00%.

EXAMPLE XVIII 2-(p-aminomethylbenzyl)-2-piperidinemethanol.—To a suspension of 8 g. of lithium aluminum hydride in 100 ml. of dry 1,2-dimethoxyethane is added a solution of 8 g. of ethyl 2-(p-cyanobenzyl)-6-oxopipecolate in 100 ml. of dry 1,2-dimethoxyethane. The stirred mixture is refluxed overnight. The grey reaction mixture is cooled to <10° C. and water (30 ml.) is added dropwise so that the temperature does not exceed 10° C. The suspension is allowed to stir for 0.5 hour at room temperature. The inorganics are filtered off and washed with 1,2-dimethoxyethane and ether. After drying the filtrate over anhydrous magnesium sulfate, the filtrate is concentrated in vacuo to give about 5.8 g. of crude product as an oily residue. The oil is dissolved in 100 ml. of ether and treated with charcoal. After filtering, the filtrate is treated with a methanolic solution of hydrogen chloride to pH <3. The thus-obtained 2-(p-aminomethylbenzyl)-2 - piperidinemethanol dihydrochloride is purified by recrystallization from methanol-ether, M.P. 246–248° C. (dec.). Treatment with alkali metal hydroxide affords the corresponding free base.

*Analysis.*—Calcd. for $C_{14}H_{23}N_2O \cdot 2HCl$ (percent): C, 54.73; H, 7.87; N, 9.12. Found (percent): C, 54.55; H, 7.74; N, 8.91.

EXAMPLE XIX

By following the procedures of Examples XVII and XVIII, except that an equivalent quantity of ethyl 2-(m-aminobenzyl)-6-oxopipecolate is used in place of the corresponding p-aminobenzyl derivative, there is obtained as the final product, 2-(m-aminomethylbenzyl)-2-piperidinemethanol.

EXAMPLE XX

This example demonstrates the anti-arrhythmic activity possessed by the subject compounds of Formula I.

The right atrium of an anesthetized dog is exposed by right thoracotomy and retraction of the pericardium. Atrial fibrillation, as determined by a standard ECG limb lead, is induced by placing two drops of a 10% solution of acetylcholine on the atrium and then stroking the atrium with a blunt spatula. The period of fibrillation is recorded.

Two control periods of fibrillation are produced at 15 minutes intervals. The compound to be tested is administered i.v. ten seconds after the next induction. A compound is classified as active if it decreases the period of fibrillation by at least 50%. In the following table, the MED (minimum effective dose) of several compounds of Formula I are listed, it being understood that such compounds are not listed for purposes of limiting the invention thereto, but only to exemplify the useful properties of all the compounds within the scope of Formula I, including the pharmaceutically acceptable acid addition salts thereof.

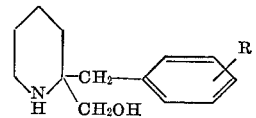

| R: | MED (mg./kg.) |
|---|---|
| p-Dimethylamino | 5–10 |
| p-Amino | 1–2.5 |
| m-Amino | 5–10 |
| p-Benzyloxy | 5–10 |
| p-Hydroxy | 20 |
| p-Aminomethyl | 10–20 |

What is claimed is:

1. A chemical compound selected from the group consisting of a 2-benzyl-2-piperidinemethanol having the formula:

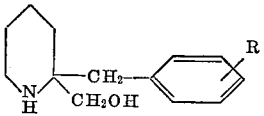

wherein R is a substituent in the para- or meta-position of the benzyl moiety, said substituent being a member selected from the group consisting of amino, dimethylamino, hydroxy, benzyloxy and aminomethyl, and the therapeutically active acid addition salts thereof.

2. The compound of claim 1 which is 2-[p-(N,N-dimethylamino)benzyl]-2-piperidinemethanol.

3. The compound of claim 1 which is 2-(p-aminobenzyl)-2-piperidinemethanol.

4. The compound of claim 1 which is 2-(m-aminobenzyl)-2-piperidinemethanol.

5. The compound of claim 1 which is 2-(p-benzyloxybenzyl)-2-piperidinemethanol.

6. The compound of claim 1 which is 2-(p-hydroxybenzyl)-2-piperidinemethanol.

7. The compound of claim 1 which is 2-(p-aminomethylbenzyl)-2-piperidinemethanol.

8. Ethyl 2-aralkyl-6-oxopipecolate having the formula:

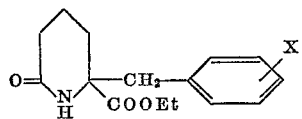

wherein the X substituent is in the p- or m-position and a member selected from the group consisting of nitro, amino, hydroxy, cyano, dimethylamino and benzyloxy.

References Cited

UNITED STATES PATENTS 2,928,835   3/1960   Jacob et al. _____ 260—294.3

OTHER REFERENCES

Koelsch, J. Am. Chem. Soc. 65, 2458–9 (1943).

HENRY R. JILES, Primary Examiner

G. THOMAS TODD, Assistant Examiner

U.S. Cl. X.R.

260—293.4, 294, 471, 999